Sept. 12, 1967

J. ZEMANEK, JR 3,340,953

ACOUSTIC LOGGING OF CASED BOREHOLES AT A FREQUENCY
DETERMINED BY CASING THICKNESS

Filed Feb. 18, 1966

JOSEPH ZEMANEK, JR.
INVENTOR.

BY James C. Fails

ATTORNEY

United States Patent Office 3,340,953
Patented Sept. 12, 1967

3,340,953
ACOUSTIC LOGGING OF CASED BOREHOLES AT A FREQUENCY DETERMINED BY CASING THICKNESS
Joseph Zemanek, Jr., Dallas, Tex., assignor to Mobil Oil Corporation, a corporation of New York
Filed Feb. 18, 1966, Ser. No. 528,536
6 Claims. (Cl. 181—.5)

ABSTRACT OF THE DISCLOSURE

The specification discloses a method of logging cased boreholes in which there is employed time-spaced pulses of acoustic energy having a predominant frequency $f$ selected such that the velocity of the acoustic energy in the casing is constrained to the velocity of the shear wave therein. The frequency $f$ is determined by the formula:

$$f = \frac{\Omega V_s}{2\pi h}$$

where, $\Omega$ = dimensionless frequency and has a value of from 3.7 to 5.7,
$V_s$ = shear velocity of the acoustic energy in the casing, and
$h$ = thickness in consistent units.

Ordinarily, the frequency $f$ is in excess of 100 kilocycles per second. Very little modification is required in conventional logging apparatus in order to employ this frequency. The improvement obtained by employing this frequency is used advantageously in velocity logging, amplitude logging, or frequency logging.

---

This invention pertains to methods for investigating characteristics of subterranean formations penetrated by a borehole. More particularly, it pertains to methods employing acoustic energy for investigating characteristics of subterranean formations situated behind a casing which traverses the borehole.

It is common practice to employ acoustic energy to investigate characteristics of subterranean formations penetrated by uncased boreholes. Of particular interest in the search for petroleum are the porosities, permeabilities, and fluid contents of subterranean formations. The acoustic properties of a given formation are intimately associated with the foregoing characteristics, and thus measurements that are directly related to and controlled principally by acoustic properties of a formation constitute valuable information regarding the lithology of the subterranean formations.

Any of the major types of well-known acoustic logging systems may be employed to investigate the acoustic properties of the subterranean formations. For example, an acoustic velocity logging system such as described in U.S. Patent Re. 24,446 to G. C. Summers, Velocity Well Logging, or U.S. Patent 2,949,973 to R. A. Broding et al., Methods of and Means for Measuring Travel Times Through Earth Formations, may be employed for effectively measuring the velocity with which acoustic pulses are propagated through the subterranean formations. Alternatively, an acoustic amplitude logging system such as described in U.S. Patent 3,191,145 to G. C. Summers, Bore Hole Transmission in Well Logging Systems, may be employed for measuring the amplitude of the acoustic pulses after passing through the subterranean formations; or an acoustic frequency logging system such as described in U.S. Patent 2,956,635 to G. C. Summers, Acoustic Pulse Frequency Log, or U.S. Patent 2,956,634 to applicant, System for Acoustic Pulse Frequency Logging, may be employed for effectively measuring the average frequency of the acoustic pulses after passing through the subterranean formations.

In the most commonly employed method of using acoustic energy, time-spaced pulses of acoustic energy of relatively low frequency are transmitted into the subterranean formations by a transmitting means, comprising one or more transmitters, at measured depths within the borehole; and the time-spaced pulses are received by receiving means, comprising one or more receivers, located in spaced relationship with the transmitting means. Excellent systems employing variations of this basic method have been developed, e.g., as described in the previously cited U.S. Patent Re. 24,446 and in the previously cited U.S. Patent 3,191,145.

While such methods have gained commercial success in logging uncased boreholes, they are not generally satisfactory for logging cased boreholes. The reason why such methods employing low frequency acoustic energy are not satisfactory for logging cased boreholes lies in the basic physics of the propagation of acoustic energy. Acoustic energy propagates through a material of finite dimensions at a velocity which is different from the velocity through a material, even the same material, of infinite dimensions. Examples of materials of finite dimensions are the casing and the cement sheath thereabout. An example of material of effectively infinite dimensions is a subterranean formation. The velocity of acoustic energy in a finite medium varies with respect to frequency. The low frequency acoustic energy, for example, having a predominant frequency of about 20 kilocycles, travels along the casing with a high velocity of about 17,000 feet per second. This results in early arrival of the acoustic energy at the receiving means. This early arriving acoustic energy sometimes interferes with later arriving acoustic energy having traveled through a formation having a lower velocity of propagation for the acoustic energy. The degree of interference may depend on the type of logging system being employed. However, in casing having poor cement bonding, the interference is particularly severe and undesirable in all types of logging systems, since it may result in a ringing effect which often completely masks the later arriving acoustic energy.

It is a feature of this invention to employ acoustic energy having a frequency selected such that the velocity of the acoustic energy in the casing is constrained to the velocity at which the shear wave of the acoustic energy is propagated in the casing, e.g., about 10,000 feet per second. Thus, by employing such a frequency, there is realized the object of the invention to provide a method of acoustically investigating, or logging, subterranean formations adjacent a cased borehole and in which acoustic energy is propagated at velocities greater than the velocity of the shear wave of the acoustic energy in the casing without regard to whether or not the casing has good cement bonding.

Further objects and attendant advantages of the invention will be apparent from the following detailed description taken in conjunction with the accompanying drawings in which:

FIGURE 2 is a plot of experimentally observed relationships between the dimensionless group velocity $V_g/V_s$ versus dimensionless frequency $\Omega$; and FIGURE 3 is a schematic representation of an electrical circuit employed in the modified logging tool.

In accordance with the invention, subterranean formation adjacent a cased borehole are logged by probing with time-spaced pulses of acoustic energy. The pulses, after travel through the formation, are received at a point spaced from the point of generation. A function dependent on the received acoustic pulse is generated as representative of acoustically determinable character of subterranean formations. The acoustic energy employed will have a predominant peak frequency $f$ determined by the expression:

$$f = \frac{\Omega V_s}{2\pi h}$$

where, (1)

$\Omega$ = an arbitrary number, termed dimensionless frequency and defined by Equation 1, which has a value within the range of from 3.7 to 5.7;

$V_s$ = velocity of the shear wave, commonly termed shear velocity, of the acoustic energy in the casing in the usual units of length per unit of time, e.g., in inches per second; and $h$ = the thickness of the casing in consistent units of length, e.g., in inches. Ordinarily, the acoustic energy will have a predominant frequency $f$ in excess of 100 kilocycles.

Figure 1:
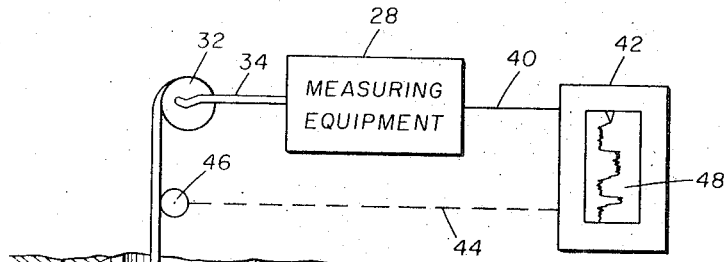
FIGURE 1 is a schematic representation of a two-receiver logging tool modified to employ the method of the invention.
Figure 1:
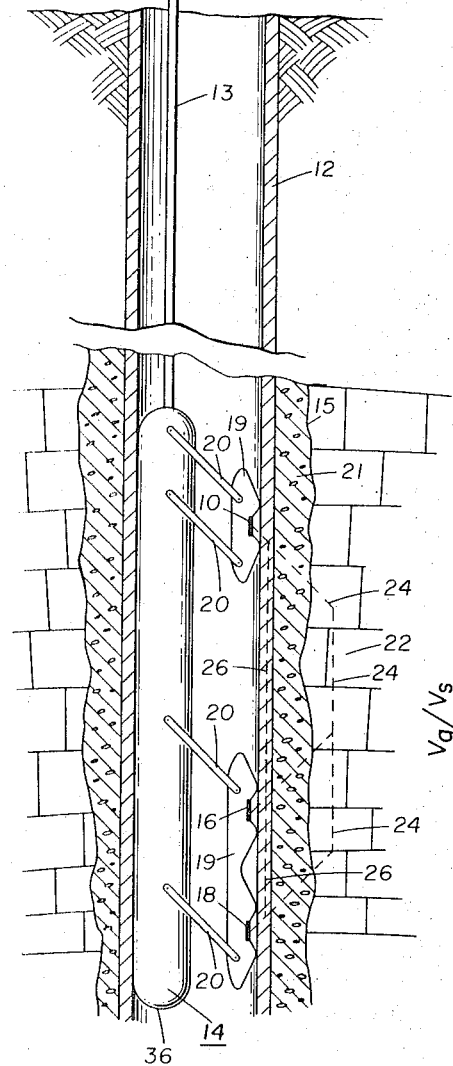
Figure 1:
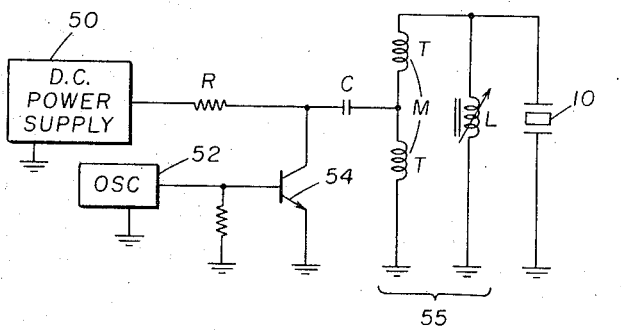
Figure 1:
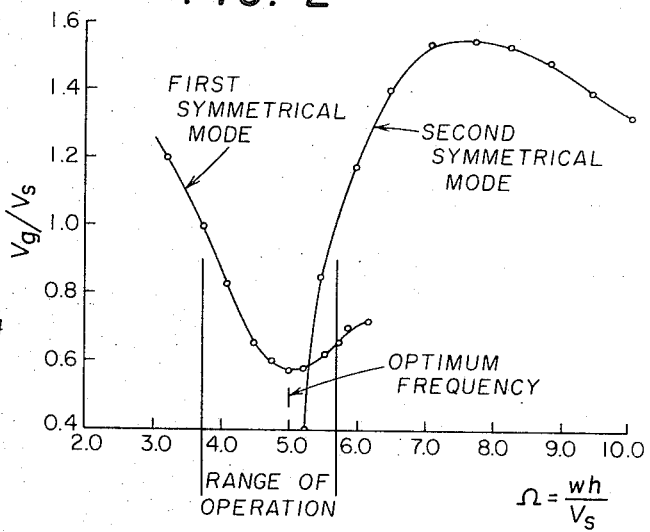

Referring now to FIGURE 1, an acoustic velocity well logging system is illustrated in which high frequency transducer 10, serving as a transmitter, is positioned adjacent casing 12 at depth measured by cable 13 suspending tool 14 in borehole 15. Similarly positioned adjacent casing 12 and spaced longitudinally from transmitter 10 and from each other are high frequency transducers 16 and 18 serving, respectively, as first receiver and second receiver. The high frequency transducers are secured in pads 19, held adjacent the casing by hollow spring biasing means 20. Upon appropriate electrical excitation, as described hereinafter, transmitter 10 emits, singly, time-spaced pulses of acoustic energy having a dominant peak frequency $f$ defined by Equation 1 directionally into casing 12, and into cement sheath 21 bonding casing 12 to subterranean formations 22 penetrated by borehole 15. For simplicity, two primary paths of travel for the acoustic energy are illustrated as ray paths 24 and 26. Ray path 24 represents the path a portion of the acoustic energy will follow through the casing, through the cement sheath, and downward through the subterranean formation, being refracted back through the cement sheath and the casing to first receiver 16 and also via a longer path through additional formation and similar refraction to second receiver 18. On the other hand, ray path 26 represents an alternate path of travel for a portion of the acoustic energy downward along casing 12 to the first receiver 16 and to the second receiver 18.

The portion of acoustic energy arriving at first receiver 16 activates the high frequency transducer which supplies appropriate electrical signals via continuous conducting means (not shown) to measuring equipment 28. Similarly, the portion of acoustic energy arriving at second receiver 18 activates the high frequency transducer which also supplies appropriate electrical signals via a continuous conducting means (not shown) to measuring equipment 28.

Measuring equipment 28 and the attainment of continuous conducting means, e.g., via conductors in cable 13, brushes (not shown) within cable drum 32, and conductors in line 34 from the brushes to measuring equipment 28, are well known in the art of velocity logging and, hence, need not be discussed here. Further, case 36, housing components of the logging tool, and the components of the logging tool are well known to the acoustic velocity logging art. Also, pads suitable for use as pads 19 holding transducers 10, 16, and 18; spring elements suitable for use as spring biasing means 20 maintaining pads 19 adjacent the casing; and the conductors (not shown) located within pads 19 and within hollow spring biasing means 20, and connecting transducers 10, 16, and 18 to logging tool components within case 36 are known to the acoustic velocity logging art, do not constitute the inventive aspect herein, and need not be described here. However, a modification of the transducers to produce and be responsive to high frequency acoustic energy, an electrical circuit to ensure operation of transmitting transducer at the desired high frequency, alternative cable conductor and signal detection arrangements, and a preferred construction and arrangement for pads 19 in different borehole fluids are discussed hereinafter.

Based on the electrical signals from the respective receivers, measuring equipment 28 then generates a function representative of the magnitude of the time elapsed between the arrival of the acoustic energy at first receiver 16 and the arrival of the acoustic energy at second receiver 18. The function representative of the magnitude of elapsed time is then sent via conductor 40 to recorder 42 where it is recorded. Recorder 42 is connected via mechanical coupling 44 to depth measuring sheave 46 and moves log 48 in proportion to movement of cable 13 over sheave 46. Recorder 42 thus produces a log of the elapsed times of travel (and, hence, inversely, of velocity) of acoustic energy through known sectors of the subterranean formation adjacent the cased borehole, plotted against the depth of the sectors. Such recording is also well known in the well logging art.

In the portion of the pulse of acoustic energy which travels downward along the casing, illustrated as ray path 26, the velocity of each and all of the waveforms, including the compressional wave, is constrained to a velocity equal to or less than the velocity of the shear wave in the casing. The acoustic energy traveling via ray path 26 will arrive at first receiver 16 and will arrive slightly later at second receiver 18 after a substantially constant elapsed time, since the shear wave will arrive at its usual time even if the group waves are constrained to slower velocities.

In casing 12, which is well bonded by cement sheath 21 to subterranean formations 22, the acoustic energy arriving at receivers 16 and 18 does not interfere since it activates the high frequency transducers so feebly that they supply an electrical signal which has an amplitude less than the threshold level required to cause operation of the measuring equipment 28. Thus, any interference caused by acoustic energy traveling along a casing is limited to casing having poor cement bonding. Further, even when the acoustic energy activates the high frequency transducers sufficiently to supply an electrical signal which has an amplitude great enough to cause operation of the measuring equipment, useful information is afforded regarding the sectors of subterranean formation in which the interference occurs. For example, the occurrence of the interfering, constant value elapsed time signal indicates that the velocity with which acoustic energy is propagated through the sector of subterranean formations is substantially equal to or less than the velocity of the shear wave of the acoustic energy in the casing.

A particular advantage of the method of the invention is that it may be employed in any conventional acoustic logging apparatus with only minor modifications which are described hereinafter. For example, the method of the invention may be employed to improve any acoustic velocity logging system, including those acoustic velocity logging systems employing alternate switching of receivers and described in previously cited U.S. Patent 3,191,145. Moreover, while the use of the method of the invention has been particularly described with regard to improving an acoustic velocity logging system, it may be employed also to improve an acoustic amplitude logging system such as described in the previously cited U.S. Patent 3,191,145. Further, it may be employed to improve an acoustic frequency logging system such as described in the previously cited U.S. Patent 2,956,634 and U.S. Patent 2,956,635.

While it is not intended that the claims be limited to the consequences of a particular theory, the following theoretical and empirical observations are offered in explanation of how using the method of the invention enables acoustically examining subterranean formations having a compressional velocity for acoustic energy as low as the shear velocity for the acoustic energy in the casing. As previously indicated, the velocity of acoustic energy in the casing varies with respect to frequency. For a given frequency, acoustic energy is propagated in the casing by means of a finite number of modes of propagation, each assuming significance after preceding modes. Referring to FIGURE 2, the dimensionless group velocity $V_g/V_s$ is plotted against dimensionless frequency $\Omega$ for the first and second symmetrical modes of propagation of acoustic energy in the casing; where, $V_g$=the velocity of the group waves, including the compressional wave and waves other than the shear wave, of the acoustic energy in the casing, in units of length per unit time;

$V_s$=the velocity of the shear wave of acoustic energy in the casing, in consistent units of length per unit time;

$\Omega = wh/V_s$;

$w = 2\pi f$;

$f$=predominant peak frequency of the acoustic energy; and $h$=thickness of the casing in consistent units of length.

By the first symmetrical mode of propagation, the dimensionless group velocity of the acoustic energy in the casing decreases as the dimensionless frequency increases. When the dimensionless frequency reaches a value of approximately 3.7, the dimensionless group velocity has decreased to a value of 1. The dimensionless group velocity continues to decrease, reaching a minimum of approximately 0.6 when the dimensionless frequency has a value of approximately 5.0. The dimensionless group velocity then starts to increase again. However, before the dimensionless group velocity again exceeds a value of 1 by the first symmetrical mode of propagation, the second symmetrical mode of propagation begins to assume importance, rising rapidly to a dimensionless group velocity of about 1 when the dimensionless frequency has a value of about 5.7. Thus, there is a range of values of dimensionless frequency $\Omega$ of from about 3.7 to about 5.7 within which the group velocity of the acoustic energy in the casing is constrained to a magnitude the same or less than the velocity of the shear wave in the casing. For example, employing acoustic energy having a frequency of about 320 kilocycles in ¼-inch steel casing in accordance with the method of the invention, the dimensionless frequency of the acoustic energy in the casing will be about 4.0. This acoustic energy will be propagated in the casing by the first symmetrical mode of propagation. Further, the group waves of the acoustic energy in the casing will be propagated at a velocity about 0.82 times the velocity of the shear wave in the casing, i.e., $V_g=0.82V_s$. In contrast, when employing conventional logging frequency of about 20 kilocycles in ¼-inch steel casing, the dimensionless frequency $\Omega$ has a value of about 0.16. Although not shown in FIGURE 2, at this value, the group velocity is about 1.7 times as great as the shear velocity, i.e., $V_g=1.7V_s$.

As indicated in the foregoing discussion, an optimum dominant peak frequency $f$ of the pulses of acoustic energy is selected on the basic of the thickness and type of casing in the borehole in accordance with Equation 1 to obtain the requisite dimensionless frequency. For example, a typical steel casing having ¼-inch wall thickness and a shear velocity of 127,000 inches per second would require an optimum frequency $f$ of about 400 kilocycles per second to obtain an optimum dimensionless frequency $\Omega$ value of 5.0. The range of operation of $\Omega$ from 3.7 to 5.7 would thus require a frequency $f$ within the range of from about 300 kilocycles to about 460 kilocycles, respectively. Table I contains typical casing thicknesses and the range of frequencies which are employed therewith in the method of the invention.

TABLE I

| Casing Wall Thickness (in inches) | Approximate Minimum Frequency (in c.p.s.) | Optimum Frequency (in c.p.s.) | Approximate Maximum Frequency (in c.p.s.) |
|---|---|---|---|
| ¼ | 300,000 | 400,000 | 460,000 |
| ⅜ | 200,000 | 270,000 | 310,000 |
| ½ | 150,000 | 202,000 | 230,000 |

To obtain the best logging information inherent in using the higher acoustic frequencies, minor modifications are made in some of the equipment. For example, the high frequency transducers 10, 16 and 18 employed in the transmitter and in the receivers are made thinner than the transducers employed in conventional 20-kilocycle logging systems. However, the high frequency transducers are still preferably piezoelectric crystals of barium titanate or of barium titanate modified to operate at higher temperature. Such modified barium titanate crystals are illustrated by Clevite's PZT. To obtain the resonant frequency in the desired range, the thickness of the crystal may be obtained from commercial suppliers. For example, to obtain a resonant frequency of 300 kilocycles, the Clevite Corporation Bulletin No. 9247 indicates that their barium titanate crystal should have a thickness of 0.26 inch.

Moreover, to ensure that high frequency transducer 10 operates in the transmitter at the selected frequency $f$, a circuit similar to the one shown schematically in FIGURE 3, should be employed to afford appropriate electrical excitation therefor.

In FIGURE 3, high voltage D.C. power supply 50 is connected to and charges capacitor C through resistance R. Capacitor C is connected to one side of high frequency transducer 10, the other side of which is connected to ground. Oscillator 52 is connected to oscillator-actuated, solid-state switch 54, such as a silicon controlled rectifier. Capacitor C is connected to one side of switch 54, the other side of which is connected to ground. At a designed repetition rate, oscillator 52 pulses switch 54, rendering it temporarily conductive. Typically, oscillator 52 is designed to pulse switch 54 at a repetition rate in the range of from about fifteen to about fifty times per second, e.g., twenty times per second. When switch 54 is rendered conductive, the electrical energy stored on charged capacitor C is transferred to and pulses high frequency transducer 10, causing it to transduce the electrical excitation into acoustic energy. To optimize the transfer of energy from capacitor C to transducer 10 and to obtain the acoustic energy of the desired high frequency $f$, an impedance-matching and frequency-matching network 55 is provided therebetween. The network 55 consists of autotransformer T and variable inductor L. Autotransformer T is connected to capacitor C such that capaictor C discharges, when switch 54 is rendered conductive, through one winding to ground and induces an additive voltage in the second winding, thus increasing the voltage exciting transducer 10. Inductor L is of the variable type to facilitate tuning the network 55 to obtain the maximum power output, determined by empirical measurements, from any particular transducer 10 at the desired frequency. Since the tuned, matching network 55 thus resonates at the desired frequency $f$, undesired resonant frequencies, such as lower frequencies produced by flexural modes of the transducer 10, are suppressed.

Essentially no modification need to be made of the electrical circuit and equipment associated with the receivers in conventional acoustic logging apparatus in order to employ acoustic energy of frequency $f$ determined in accordance with Equation 1. Further, the electrical signals generated by the arrival of the acoustic energy of the desired frequency at each receiver may be amplified and transmitted directly to the measuring equipment at the surface in whatever manner is usually employed by the conventional logging system. Good fidelity with such direct amplification and transmission necessitates employing coaxial logging cable having good high frequency transmission characteristics, e.g., similar to those of cable having standard specification RG58A/U. Specifically, No. 20 AWG Cable having such characteristics is available from Vector Cable Company, Houston, Tex. On the other hand, the envelope of the electrical signals generated by the arrival of the acoustic energy may be amplified and transmitted to the measuring equipment when the logging cable conductor is not a coaxial logging cable having good high frequency transmission characteristics. The measurement of the envelope of the electrical signals is simply a demodulation process such as described in Radio Engineers' Handbook, F. E. Terman, 1st Ed., 8th Impression, McGraw-Hill Book Co., Inc., New York and London, 1943, pages 553 et seq. Specifically suitablefor detecting the envelope of the electrical signals is the diode rectifier type detector illustrated in FIGURE 25a and described at pages 553 and 554 therein for taking a signal input and converting it to an envelope having a lower frequency. The envelope of the electrical signals is thus of a lower frequency than the relatively high frequency of the acoustic energy and may be employed directly in conventional acoustic velocity or acoustic amplitude logging equipment.

To reduce the attenuation of the relatively high frequency acoustic energy, the high frequency transducers 10, 16 and 18 in FIGURE 1 are maintained in close proximity to the casing 12. Moreover, it is also desirable to have good acoustic coupling to the casing; hence, it is preferred that the borehole be filled with a liquid. With such good acoustic coupling, pads 19 are preferably constructed to hold the transducers slightly recessed from the casing wall. Each of the transducers and their respective electrical conductors should be enclosed within a sealed, thin, insulating covering in the manner known to the acoustic logging art. The liquid acoustic coupling between the transducers and the casing should be less than ½ inch in thickness, preferably about 3/16 inch. The pads 19 are preferably constructed of a tough, yet sound-absorbent, material such as neoprene. The pads should surround the transducers on at least three sides and preferably on all sides except directionally into the casing wall to induce directivity to the acoustic pulses.

Infrequently, it may be necessary to log a borehole which is filled with gas or other fluid affording relatively unsatisfactory acoustic coupling. For such logging operations, pads 19 preferably are constructed to hold the transmitting means and the receiving means at the outer extremity of the pads and in physical contact with the casing. In such a construction, the transducers in the transmitting means and in the receiving means are enclosed within small, oil-filled chambers which will flex to conform the irregularities of the casing and achieve a better coupling with less wear on the transducers.

The pads 19 containing transmitter 10 and receivers 16 and 18 are illustrated in FIGURE 1 in the preferred position in which they are spring-biased my any of the known means against casing 12 in the same direction from the center of the borehole. In this way, directional acoustic transmission and reception are accomplished, further lessening attenuation of the high frequency acoustic energy being employed.

Although the invention has been described with a certain degree of particularity, it is understood that the present disclosure has been made only by way of example and that numerous changes in the details of construction and the combination and arrangement of parts may be resorted to without departing from the spirit and the scope of the invention as hereinafter claimed.

What is claimed is:

1. A method of logging acoustically determinable properties of subterranean formations traversed by a borehole containing a casing, comprising the steps of:

(a) applying, at a point of application at measured depth, to the casing, and thence to the subterranean formations, time-spaced pulses of acoustic energy having a predominant frequency $f$ in excess of 100 kilocycles and selected for the casing in accordance with the expression:

$$f = \frac{\Omega V_s}{2\pi h}$$

where,
$\Omega$ = a dimensionless frequency having a value within the range of from 3.7 to 5.7,
$V_s$ = shear velocity of said acoustic energy in the casing in units of length per unit time, and
$h$ = thickness of the casing in consistent units of length;

(b) receiving said time-spaced pulses of acoustic energy refracted through and from the formations at at least one point in spaced relationship with said point of application;

(c) generating a function related to said received pulses and representative of information concerning acoustically determinable characteristics of the formations; and (d) recording said function with respect to depth in the borehole.

2. The method of claim 1 wherein $\Omega$ equals 5.

3. The method of claim 1 wherein said function of step (c) is related to the velocity with which said detected pulses traveled through said subterranean formations.

4. The method of claim 1 wherein said function of step (c) is related to the amplitude of said received pulses.

5. The method of claim 1 wherein said function of step (c) is related to the average frequency of said received pulses.

6. The method of claim 1 wherein said time-spaced pulses of acoustic energy are received in step (b) at more than one point in spaced relationship with said point of application.

No references cited.

BENJAMIN A. BORCHELT, *Primary Examiner.*

R. M. SKOLNIK, *Assistant Examiner.*